United States Patent [19]
Fannin et al.

[11] 3,736,645
[45] June 5, 1973

[54] ASSEMBLY METHOD FOR HYDRAULIC ENERGY ABSORBERS

[75] Inventors: Wayne V. Fannin; Loren R. Gute, both of Dayton; Wilbur J. Zimmerle, Bellbrook, all of Ohio

[73] Assignee: General Motors Corporation, Detroit, Mich.

[22] Filed: Nov. 5, 1971

[21] Appl. No.: 196,138

[52] U.S. Cl. ..........................29/422, 29/434, 29/469
[51] Int. Cl. .............................................B23p 17/00
[58] Field of Search.....................29/422, 428, 434, 29/437, 469; 267/116, 64 R, 139; 293/60, 70, 73; 213/223, 43

[56] References Cited

UNITED STATES PATENTS

| | | | |
|---|---|---|---|
| 2,348,160 | 5/1944 | Thornhill | 267/64 R |
| 2,882,592 | 4/1959 | Bourcier de Carbon | 29/434 |
| 2,963,175 | 12/1960 | Thornhill | 213/223 |
| 3,056,194 | 10/1962 | Kahn et al. | 29/434 |
| 3,423,817 | 1/1969 | Bobo | 29/422 X |
| 3,700,273 | 10/1972 | Jackson et al. | 213/223 X |

*Primary Examiner*—Richard J. Herbst
*Assistant Examiner*—Victor A. DiPalma
*Attorney*—W. E. Finken and D. L. Ellis

[57] ABSTRACT

An hydraulic energy absorber unit comprising telescopic cylinder and piston tubes defining variable volume liquid-filled chambers therein and adapted to absorb energy upon displacement from a rest or normal extended position to an inwardly telescoped position is assembled in a manner to have one of the variable volume chambers filled in the rest position of the unit with a predetermined quantity of reserve fluid transmitting to the remainder of the unit a preload force exerted by a spring chamber piston within the piston tube. The piston tube subassembly is loaded with a gas at an initial predetermined pressure prior to insertion thereof within the cylinder tube subassembly filled with liquid, such insertion being accomplished with the aid of a sealing ring on the piston tube which causes the latter to displace the predetermined quantity of fluid into the piston tube chamber and further pressurize the gas spring up to the final desired pressure, whereafter the piston and cylinder tube subassemblies are provided with a one-way limit stop preventing further extension of the unit from the rest or as-assembled normal extended position.

5 Claims, 6 Drawing Figures

PATENTED JUN 5 1973

INVENTORS.
Wayne V. Fannin,
Loren R. Cute &
BY Wilbur J. Zimmerle
D. L. Ellis
ATTORNEY

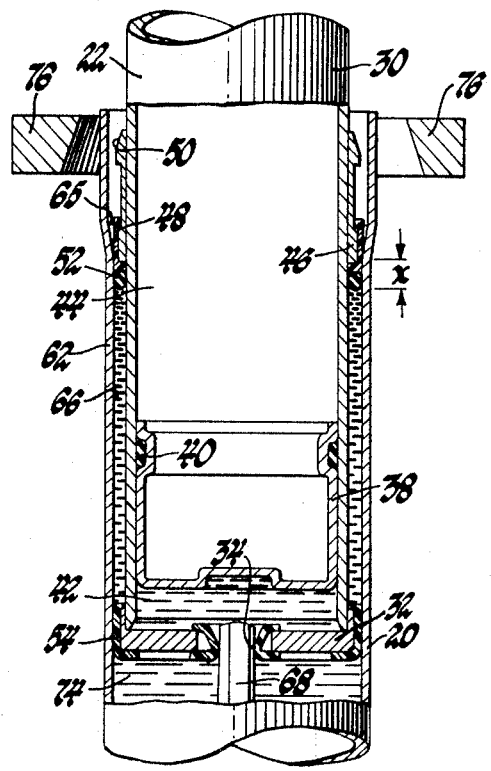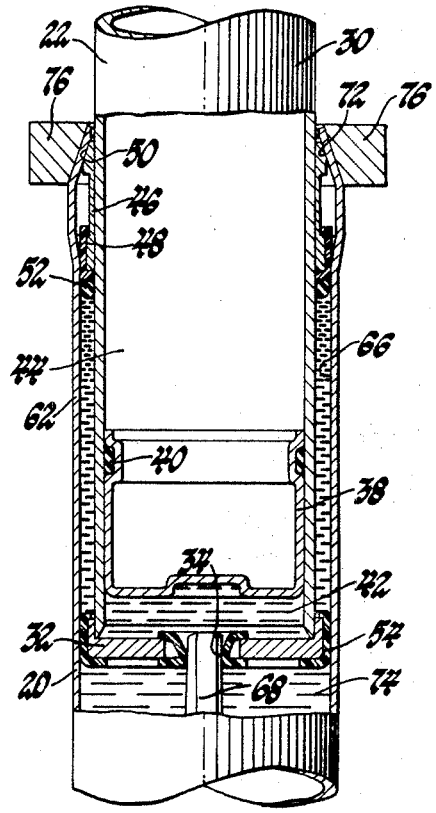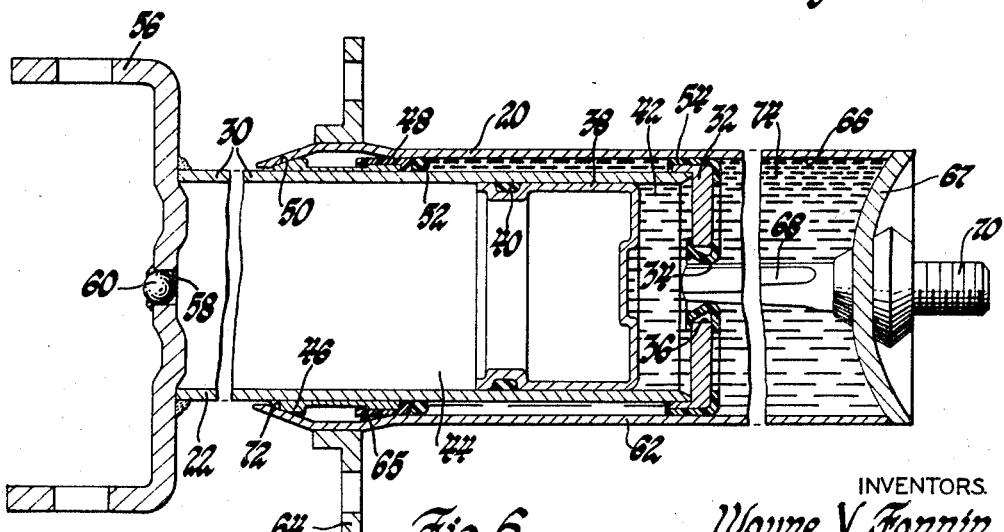

ASSEMBLY METHOD FOR HYDRAULIC ENERGY ABSORBERS

This invention relates to hydraulic energy absorbers and more particularly to an improved method of assembling an hydraulic energy absorber with a preload and a reserve quantity of damping liquid.

In its most specific aspects, the invention is concerned with manufacturing process for hydraulic energy absorbing units of the type which comprise a tubular cylinder and piston subassemblies telescopically related and adapted to absorb energy upon inward telescoping from a rest or normal extended position to any of a plurality of shortened conditions. An improved energy absorber unit of this type is disclosed in the copending U.S. application of Jackson et al., Ser. No. 91,008, filed Nov. 19, 1971. That energy absorber comprises the aforementioned cylinder and piston tubes, the latter of which includes an orificed end piston wall defining in part the boundary between variable volume damping liquid chambers within the cylinder and piston tubes respectively, the piston tube damping liquid chamber being further defined by a gas piston slidable within the piston tube to separate the liquid piston tube chamber from a body of gas which serves as a preloading spring. The orifice in the piston end wall of the piston tube controls flow between the liquid chambers during energy absorbing excursions under impact forces supplied to the unit, and the gas spring is subject to volumetric contraction during such excursions so that it will resiliently return the unit to the normally extended position following impacts.

The preload force in such units is often desirable particularly where, for example, the unit is applied as an energy absorber for automotive vehicle bumpers where a certain amount of force holding the unit in a normal extended position is useful in preventing rattle and other detrimental conditions when the vehicle is subjected to rough road conditions, and further to establish definite resistance force below which the energy absorber and bumper may not be deflected. It is further desirable in such units that a reserve quantity of damping liquid be provided so that the bumper supporting and energy absorbing functions of the unit are not affected when, for example, the liquid contracts due to extreme temperature changes between assembly and use in the field; leakage of damping liquid from the unit; or unusually high amounts of compressible gas or other foreign material in the body of damping liquid with which the unit is filled.

Typical assembly procedures to accomplish these objectives have to our knowledge in the past simply involved filling of the unit with damping liquid prior to or following insertion of the piston tube within the cylinder tube, whereafter the unit is loaded with a pressurized quantity of gas, in the case of the gas spring unit, or with a coil compression spring or like mechanical spring unit in other cases. Depending upon the physical configuration of the energy absorbing unit and other factors, it may be, and definitely is in the case of the Jackson et al. design, preferable in terms of cost to manufacture the unit in cylinder tube and piston tube subassemblies and have the piston tube subassembly loaded with the required charge of gas prior to its mating with the cylinder tube subassembly.

The present invention is directed to an improved assembly method for hydraulic energy absorbers contemplating the above criteria. Further to this objective, the instant assembly method contemplates the manufacture of an hydraulic energy absorber in which the gas or other force preload may be very accurately controlled to a final desired value and in which the quantity of liquid available as reserve in the piston tube may be accurately controlled as a direct result of the various steps of the assembly process.

The foregoing and other objectives, features and advantages of the invention will be readily apparent from the following specification and from the drawings in which:

FIGS. 4 and 5 illustrate the next succeeding and final assembly steps; and

FIG. 6 is a sectional view of the fully assembled energy absorber.

Figure 1:
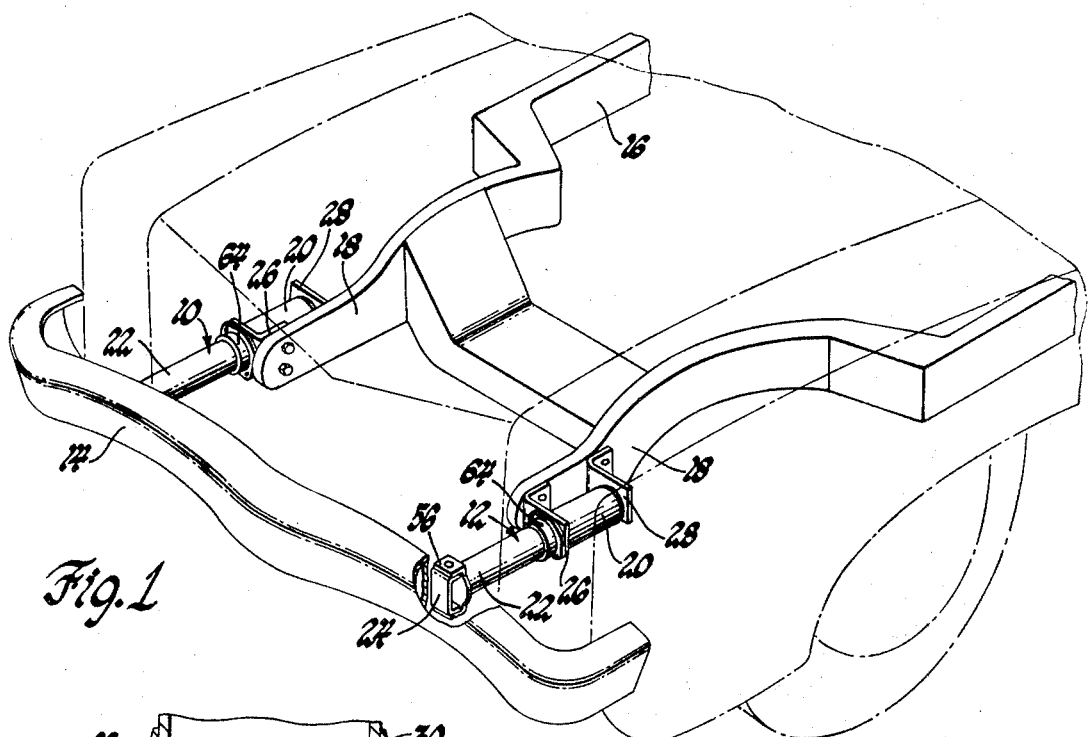
FIG. 1 is a fragmentary perspective view of an automotive vehicle body and frame incorporating hydraulic energy absorbing units, to which this invention relates, in an automotive bumper assembly.

Referring now particularly to FIG. 1 of the drawings, energy absorbing units 10 and 12 are shown installed within an automotive vehicle bumper assembly including a bumper face bar 14 extending transversely across the front of the vehicle body. Units 10 and 12 serve to mount the bumper bar 14 on the frame 16 of the vehicle, particularly on the forward horn portions 18 thereof. Units 10 and 12 are identical and each includes a cylinder tube subassembly 20 telescopically receiving a piston tube subassembly 22. As assembled, the cylinder and piston tube subassemblies are urged to rest or normal extended position in a relationship such as shown in FIG. 1. The forward end of each piston tube subassembly 22 is attached to bumper bar 14 by suitable bracket structure 24 and cylinder tube subassembly 20 has associated therewith bracket assemblies 26 and 28 which serve to mount the energy absorbing unit and respective end of bumper bar 14 to the respective frame horn 18. With the bumper bar and energy absorbing units so mounted, any impact forces applied to the bumper bar are transmitted through the energy absorbing units of the vehicle frame, and the units are adapted in a manner well known in the art to displace and present a controlled resistance during such displacement to the applied force, thereby serving to dampen or dissipate kinetic energy of such force. The displacement is occasioned by the inward telescoping of the piston tube subassemblies and bumper bar relative to the cylinder tube subassembly and frame 16.

Referring to FIG. 6 which shows the energy absorbing unit in final assembled state with the unit in the rest or normal extended position, it is seen that the piston tube subassembly comprises a cylinder 30 provided with a piston end wall 32 having an orifice 34 defined by an annular orifice element radially slidable within a bore 36 of the piston end wall. A gas piston 38 is slidably received within the piston tube cylinder 30 and provided with suitable 0-ring or like sealing engagement as at 40 to separate a variable volume piston tube damping liquid chamber 42 from a variable volume gas spring chamber 44 within the subassembly 22. An annular stop ring 46 is welded or otherwise fixed to the outer surface of the cylinder 30 and includes a raised land over which is received a glass-filled nylon or similar material bearing ring 48, such land being separated by a groove from a stop portion having a frusto-conical stop surface 50. A sealing O-ring or like sealing element 52 is received over cylinder 30 and abutted with an overlapped portion of bearing ring 48. A further bearing ring 54 similar to ring 48 is fixed over the piston end wall 32. The piston tube subassembly is completed by a clevis end cap 56 welded to the open end of the cylinder 30 to completely close the same. The clevis 56 forms a portion of the bracket assembly 24 which may, for example, including another similar clevis attached to the bumper bar 14, the two clevises being joined during vehicle manufacturing by a vertical pin through aligned bores in the clevises. Clevis 56 is centrally bored at 58 so as to receive a ball plug 60 which is weldable to the clevis following the insertion of a suitable quantity of nitrogen or other gas into the gas chamber 44 as will be described.

Figure 2:
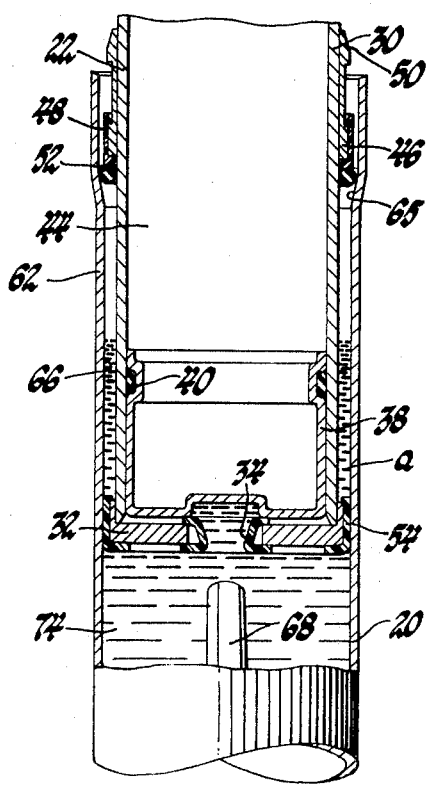
FIG. 2 is a partially broken away view of the hydraulic energy absorber components during one step of assembly thereof.

The cylinder tube subassembly 20 includes a cylinder 62 having welded adjacent its leftward open end a bracket 64 which may form a portion of the bracket assembly 26. If desired for convenience in the assembly process, bracket 64 may be omitted from the cylinder tube subassembly and affixed to the unit, as by welding, at a later time. As indicated in FIG. 2, this open end is of a spudded or otherwise formed enlarged diameter and includes a transitional frusto-conical surface 65 of limited length joined with the remaining generally straight cylindrical portion of cylinder 30 which latter defines a sealing surface 66. The other end of the cylinder is closed by a cap 67 welded thereto. Interiorly of the cap 67 is an elongated metering pin 68 adapted to cooperate with the orifice 34 in the piston tube subassembly while exteriorly of the cap 67 is a mounting stud 70 threaded so as to be inserted in the bracket 28 of the frame and threaded over with a nut. The metering pin 68 and stud 70 are preferably welded to cap 67 by resistance method in a single operation. The remaining feature of the cylinder tube subassembly 20 is a crimp stop surface 72 of frusto-conical shape complementary to the stop surface 50 of stop ring 46 on the piston tube subassembly and engageable therewith in the normal extended position of the unit, as shown, under the force of the spring preload within the unit resulting from pressurization of the gas within gas chamber 44.

In a preferred embodiment, this preload force is in the order of 750 lbs. tending to extend the piston tube subassembly from the position shown; i.e., to press stop surfaces 72 and 50 forcibly together. Thus, in a unit wherein the total piston area of piston tube subassembly 22 approximates 5 square inches, the pressure of the preloading gas spring should be 150 psi. This pressure is of course transmitted from gas piston 38 to the body of the damping liquid contained within the chamber 42 within the piston tube and the further chamber, designated 74, in the cylinder tube. While the latter is designated roughly to be that portion of the cylinder tube volume rightwardly of the piston end wall, it also includes the annular space between cylinder 30 and cylinder 62 leftwardly of the piston end wall and bounded at the left by the O-ring 52, since bearing ring 54 is purposely axially scored or sized sufficiently smaller than cylinder 62 to communicate this annular space with the remaining unfilled space of the cylinder.

It will be noted that in the normal extended position of the unit shown in FIG. 6 chamber 42 does contain damping liquid and is of some substantial size. This provides for a reserve quantity of damping liquid following the assembly process described hereinbelow, which reserve quantity is useful in maintaining some definite preload force in the unit should there be loss of fluid volume within the unit during service. Thus, whether due to leakage from the unit, severe volume contraction from temperature change, or unusually high gas content within the bulk liquid inserted into the unit, substantial liquid volume contraction may be accommodated in and of chamber 42 before gas piston 38 will bottom on piston end wall 32 and negate the desired gas spring preload. It is of course to be observed that the gas spring may be replaced by an equivalent coil compression spring or other preloading element behind the gas piston 38, or equivalent, to provide the desired preload force.

In the assembly of the energy absorbing unit according to the present invention, the piston tube subassembly, as described above, is loaded with the pressurized gas prior to mating with the cylinder tube subassembly. As indicated in FIG. 6, this may be accomplished through the use of a suitable fixture adapted to seat on the upper surface of the clevis end cap 56 to hold the ball plug 60 in a position removed from the bore 58 so as to thus insert a predetermined quantity of such gas through bore 58 into gas chamber 44 to expand the latter to its fullest extent bottoming the slidable gas piston 38 against the piston end wall 32, such as indicated in FIG. 2. The ball plug 60 is then seated in the bore 58 and welded therewithin. Cylinder tube subassembly 20 is then filled with a measured quantity of damping liquid, which quantity may be very precisely measured for purposes later to be described, to take a level in vertically oriented cylinder 62 generally at the location designated a in FIG. 2 prior to insertion of the piston tube subassembly. As shown in that view, the piston tube subassembly is then inserted to gradually raise the level of damping liquid by displacement thereof around the piston tube cylinder as O-ring 52 approaches the frusto-conical transitional surface 65. Prior to engagement with this surface, substantial clearance is present between the O-ring and the spudded enlarged diameter open end portion of cylinder 62 so that whatever ambient air present may escape from underneath the O-ring. Further insertion of the piston tube subassembly wipes the O-ring over the complete length of surface 65 to the end thereof up to the position of FIG. 3 wherein the O-ring lies at the marginal upper edge of sealing surface 66 of cylinder 62. At this point, it is preferred that the liquid level of the damping liquid has raised either precisely to this same marginal sealing surface edge to kiss the O-ring or to underlie it by some quite slight tolerance gap or volume containing ambient air. In this way, spillage of oil is avoided from the liquid chambers of the unit up into the area of stop ring 46, but rather precision measurement of the quantity of liquid to be placed in the cylinder tube subassembly prior to piston tube insertion is required.

Figure 3:
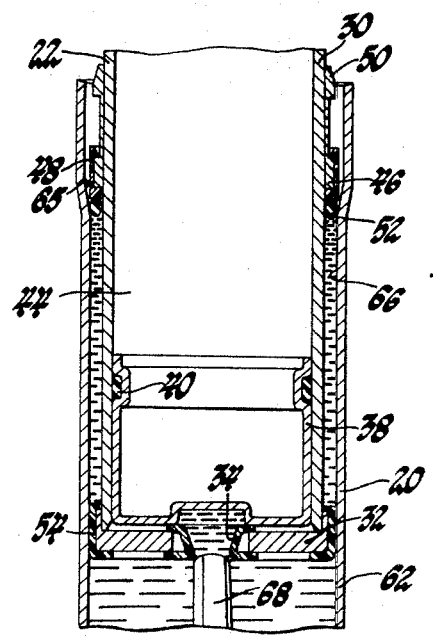
FIG. 3 is a view similar to FIG. 2 showing the next succeeding assembly step.

In the position of FIG. 3, all or very closely nearly all of the cylinder tube volume is occupied by damping liquid or by the piston tube subassembly and further insertion of the latter will accomplish the desired objective of displacing damping liquid through orifice 34 into the previously fully contracted liquid chamber 42 within the piston tube cylinder 30. Piston tube subassembly 20 is further inserted causing 0-ring 52 to wipe surface 66 over a predetermined length x as indicated in FIG. 4, this being the distance calculated to displace a predetermined desired quantity of reserve liquid. In the case of the example given above for a 5 square inch piston tube piston area, approximately one-fourth inch for dimension x is sufficient to provide substantial reserve quantity of damping liquid in chamber 42 such as shown in FIG. 4.

The damping liquid displacement occasioned by the assembly step of FIG. 4 of course results in upward displacement of the gas piston 38 from engagement with the piston end wall thereby to further pressurize the body of gas therebehind. The example of 150 psi pressure required for a 750 lb. preload must of course contemplate this pressure rise during assembly. Accordingly, the initial pressurization within the piston tube prior to insertion thereof within the cylinder tube is set at a value calculated to result in the desired final pressure following volume change in chamber 44. In the case of the above-described example using one-fourth inch final insertion distance, an initial pressure of 132 psi will result in the final desired pressure of 150 psi. The final step in the assembly of the piston and cylinder tube subassemblies is the provision or formation of a limit stop; e.g., the formation of stop surface 72 to engage stop surface 50. As indicated in FIG. 4, this may be accomplished by engaging a set of crimp dies 76 over the upper spudded open end portion of cylinder 62 while the piston tube subassembly is held displaced at least down to the position of FIG. 4. The crimping accomplished by these dies is indicated in FIG. 5 wherein it is seen the surfaces 50 and 72 are engaged to prevent retrogression or extension of the piston tube beyond the as-assembled normal extended position shown in FIGS. 1, 5 and 6.

Having thus described the invention, what is claimed is:

1. In a method of assembling an hydraulic damping device with a preload and a reserve quantity of hydraulic damping fluid, said device being of the type including a cylinder tube open at one end to receive a piston tube having a control orificed inner end piston wall and a variable volume spring chamber defined by a movable piston slidable within such piston tube, said piston tube further including an external sealing ring engageable with the inside wall of said cylinder tube, the steps comprising, loading said movable piston with a spring force-producing element expanding said spring chamber to a maximum wherein said movable piston engages said piston wall of the piston tube, filling said cylinder tube with a damping fluid, inserting said loaded piston tube into said cylinder tube to engage said sealing ring with the inside wall of the latter, further inserting said piston tube and sealing ring thereon within said cylinder tube a predetermined amount whereby a correlative quantity of fluid is displaced through the control orifice of the piston wall of said piston tube to within the latter to in turn displace the movable piston therewithin against the bias of said spring force, and providing a one-way limit stop on said cylinder tube engaging said piston tube to hold said piston tube against retrogression from said further inserted condition.

2. In a method of assembling an hydraulic damping device with a gas spring preload and a reserve quantity of hydraulic damping fluid, said device being of the type including a cylinder tube open at one end to receive a piston tube having a control orificed inner end piston wall and a variable volume gas spring chamber defined by a movable piston slidable within such piston tube, said piston tube further including an external sealing ring engageable with the inside wall of said cylinder tube, the steps comprising, filling said piston tube with a quantity of gas at a first predetermined pressure calculated with reference to a second and final predetermined pressure attained upon completion of the last of the subjoined steps, filling said cylinder tube with a damping fluid to a predetermined level, inserting said gas-filled piston tube into said cylinder tube to engage said sealing ring with the upper marginal edge of the inside wall of the latter, further inserting said piston tube and sealing ring thereon within said cylinder tube a predetermined amount whereby a correlative quantity of fluid is displaced through the control orifice of the piston wall of said piston tube to within the latter, and providing a one-way limit stop on said cylinder tube engaging said piston tube to hold said piston tube against retrogression from said further inserted condition.

3. In a method of assembling an hydraulic damping device with a preload and a reserve quantity of hydraulic damping fluid, said device being of the type including a cylinder tube open at one end to receive a piston tube having a control orificed inner end piston wall and a variable volume spring chamber defined by a movable piston slidable within such piston tube, said piston tube further including remote from said piston wall an external sealing ring engageable with the inside wall of said cylinder tube, the steps comprising, loading said movable piston with a spring force expanding said spring chamber to a maximum wherein said movable piston engages said piston wall of the piston tube, filling said cylinder tube with a damping fluid, inserting said loaded piston tube into said cylinder tube to displace the fluid contained within the latter upwardly around said piston tube until the sealing ring on said piston tube engages the upper marginal edge of the inside wall of said cylinder tube, further inserting said piston tube and sealing ring thereon within said cylinder tube a measured amount whereby a correlative quantity of fluid is displaced through the control orifice of the piston wall of said piston tube to within the latter to in turn displace the movable piston therewithin against the bias of said spring force, and providing a one-way limit stop on said cylinder tube engaging said piston tube to hold said piston tube against retrogression from said further inserted condition.

4. In a method of assembling an hydraulic damping device with a pneumatic preload and a reserve quantity of hydraulic damping fluid, said device being of the type including a cylinder tube having an inside sealing wall and open at one end to receive a piston tube having a control orificed inner end piston wall and a variable volume gas chamber defined by a movable piston slidable within such piston tube, said piston tube further including remote from said piston wall an external sealing ring engageable with said inside sealing wall of said cylinder tube, the steps comprising, loading said movable piston with gas at a predetermined pressure expanding said chamber to a maximum wherein said movable piston engages said piston wall of the piston tube, filling said cylinder tube with a quantity of damping fluid measured to attain a level substantially at the upper marginal edge of said inside sealing wall upon completion of the next recited step, inserting said loaded piston tube into said cylinder tube to displace the fluid contained within the latter upwardly around said piston tube until the sealing ring on said piston tube engages the upper marginal edge of said inside sealing wall of said cylinder tube, further inserting said piston tube and sealing ring thereon within said cylinder tube a measured amount whereby a correlative quantity of fluid is displaced through the control orifice of the piston wall of said piston tube to in turn displace the movable piston therewithin and further pressurize said gas, and providing a one-way limit stop on said cylinder tube engaging said piston tube to hold said piston tube against retrogression from said further inserted condition.

5. The method of claim 4 in which the last-named step is accomplished by crimping the marginal open end portion of said cylinder tube.

* * * * *